Figure 1:
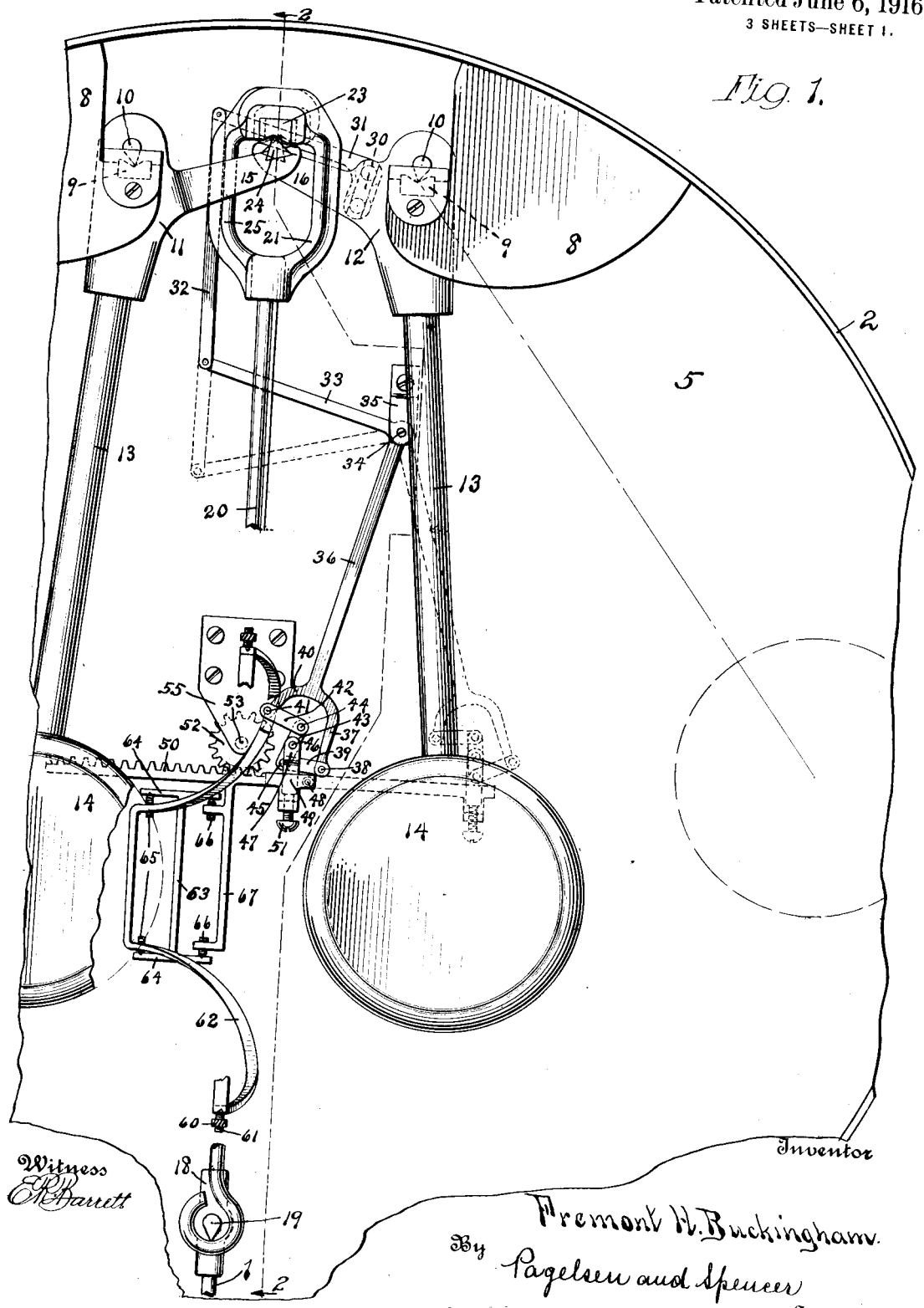

F. H. BUCKINGHAM.
PENDULUM SCALE.
APPLICATION FILED SEPT. 30, 1915.

1,185,628.

Patented June 6, 1916.
3 SHEETS—SHEET 1.

F. H. BUCKINGHAM.
PENDULUM SCALE.
APPLICATION FILED SEPT. 30, 1915.
1,185,628.
Patented June 6, 1916.
3 SHEETS—SHEET 2.
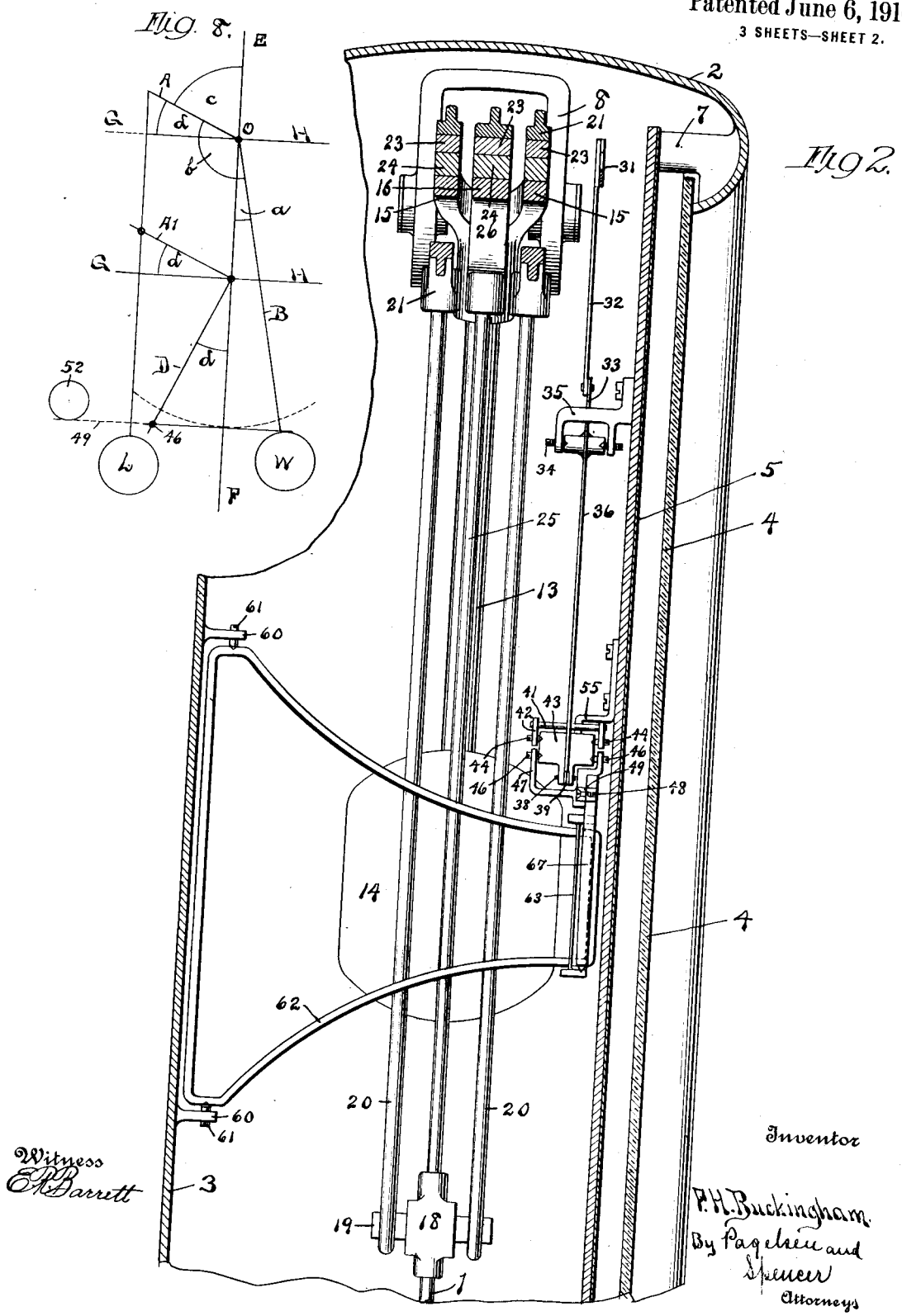

F. H. BUCKINGHAM.
PENDULUM SCALE.
APPLICATION FILED SEPT. 30, 1915.
1,185,628.
Patented June 6, 1916.
3 SHEETS—SHEET 3.
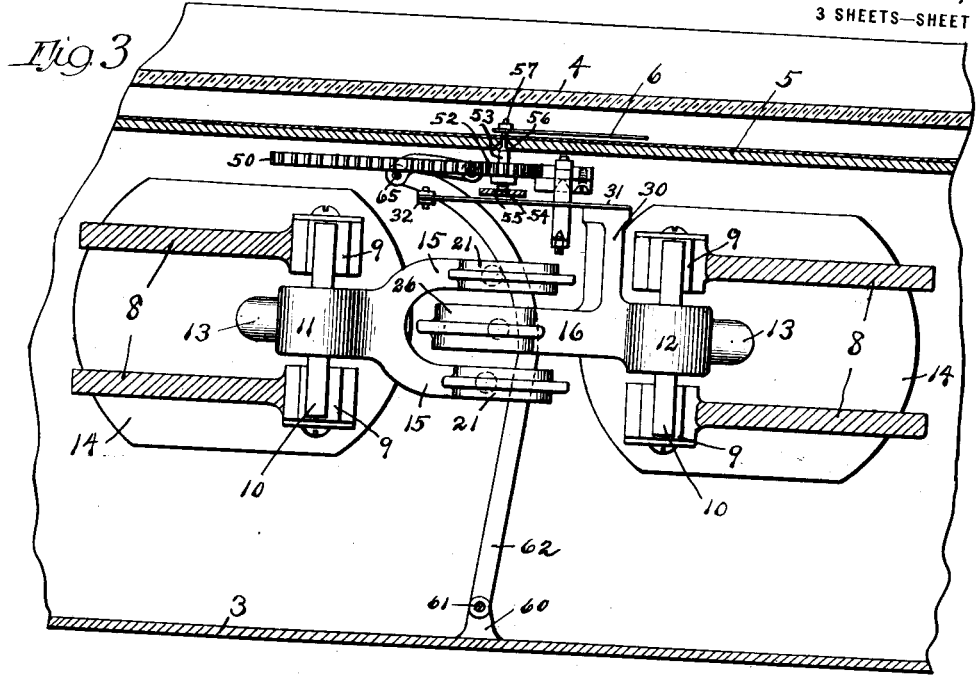
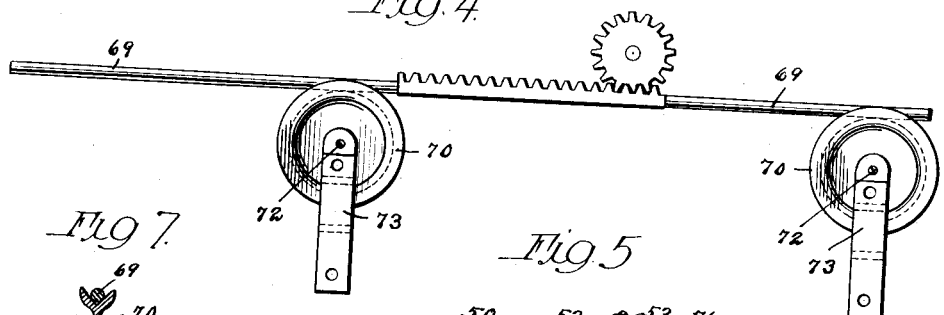
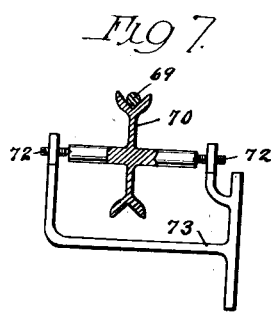
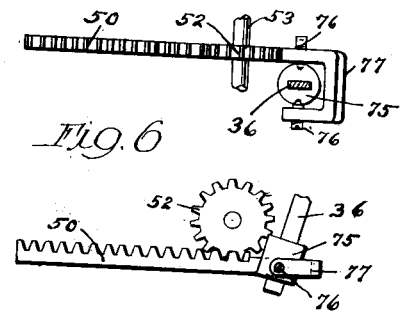
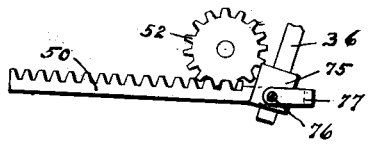
Witness
E. R. Barrett
Inventor
Fremont H. Buckingham.
By Pagelsen and Spencer
Attorneys

UNITED STATES PATENT OFFICE.

FREMONT H. BUCKINGHAM, OF DETROIT, MICHIGAN, ASSIGNOR TO STANDARD COMPUTING SCALE COMPANY, LIMITED, OF DETROIT, MICHIGAN.

PENDULUM-SCALE.

1,185,628.      Specification of Letters Patent.      Patented June 6, 1916.

Application filed September 30, 1915. Serial No. 53,239.

*To all whom it may concern:*

Be it known that I, FREMONT H. BUCKINGHAM, a citizen of the United States, and a resident of Detroit, in the county of Wayne and State of Michigan, have invented a new and Improved Pendulum-Scale, of which the following is a specification.

This invention relates to weighing scales of the type in which the loads are resisted by means of pendulums.

Its object is to provide a construction of this character in which an indicator actuated by the load will travel over an evenly graduated dial and correctly indicate the weight of the load.

This invention consists in combination with a case and a rod to which the load is attached, either directly or indirectly, of a pivoted pendulum which is swung out through the action of the load, of a pivoted indicator having a gear secured to its shaft, a rack bar engaging the gear and slidable transversely to the shaft, and a novel lever mechanism connected to the pendulum and to the rack bar, and so constructed that the rack bar will move equal distances for equal increments of load on the scale.

In the accompanying drawings, Figure 1 is a rear elevation of the weighing mechanism, the back of the case being removed. Fig. 2 is a section on the line 2—2 of Fig. 1. Fig. 3 is a plan of the weighing mechanism, the case being broken away. Fig. 4 is a detail showing another manner in which the indicator actuating bar may be mounted. Fig. 5 is a plan and Fig. 6 is an elevation of a modified form of connection between the lever system and the indicator actuating bar. Fig. 7 is a detail of a support for this actuating bar of Fig. 4. Fig. 8 is a diagram indicating the movements of the main parts of this scale.

Similar reference characters refer to like parts throughout the several views.

In the drawings, the load receiver, the base, the lever mechanism mounted within the base to support the load receiver and the pedestal mounted on the base to support the case for the indicator, are all omitted, but may be of any desired type. In fact the rod 1, which may connect at its lower end to the lever system, may itself directly support the load. In this specification this rod 1 will be considered as the load-receiving member.

This rod extends up into a case 2, preferably substantially cylindrical, having a back 3 and whose open face may be closed by a pane 4 of glass that is spaced sufficiently far from the dial 5 to permit the indicator pointer 6 to swing freely between them. This dial 5 may be supported by brackets 7 secured to the case 2. Extending from the top of the case, in pairs, are brackets 8 that support the bearings 9 for the knife edges 10 of the pendulums 11 and 12. Extending down are the pendulum rods 13 which have weights 14 connected to their lower ends. These pendulums are provided with arms that extend toward each other, which for convenience are arranged as shown in Fig. 3, the pendulum 11 having a pair of arms 15 separated sufficiently to permit the arm 16 of the other pendulum 12 to extend between them. It will be understood that two pendulums are merely a matter of convenience in construction, as the scale will operate equally well if only one is used having the same operative weight as the two.

The load supporting rod 1 carries a cross head 18 that supports the double knife edge 19. Engaging this knife edge are a pair of upright rods 20 which connect to the hooks 21 that carry the bearings 23 that rest on the knife edges 24 carried by the arms 15 of the pendulum 11. The intermediate rod 1 has an extension 25 that connects to a hook 26 which also carries a bearing 23 that rests on the knife edge 24 carried by the intermediate arm 16 of the other pendulum 12. The pair of rods 20 and the intermediate rod 25 will swing apart and toward each other at their upper ends, but the distance from the pivots 24 to the pivot 19 is so great and the angle through which these hooks swing is so small that the vertical pull on the knife edges of the arms 15 and 16 will be substantially that of the load on the rod 1.

Considering the parts in Fig. 1 as the positions normally held by the various elements, it will be understood that a load on the rod 1 will cause the weights 14 to swing apart, and that the two pendulums and the parts secured thereto may be considered as a theoretical pendulum whose center of gravity is to the right of a vertical line through the pivot 10, because of the weight of the rod and the parts connected thereto. The distance will increase as the load on the rod 1 increases. In order to change this movement of the pendulum to a direct line movement, the following mechanism is employed.

Referring to Figs. 1 and 3, it will be noticed that a post 30 projects toward the dial from the arm 16 and that it supports a crank arm 31 which carries a link 32 that is connected to an arm 33 of a bell crank lever which is mounted on the pivots 34 supported by a bracket 35 on the back of the dial 5. The pivots 34 are directly below the pivot of the pendulum 12 and the arms 31 and 33 are parallel and of the same length. The second arm 36 of the bell crank lever is bifurcated and has prongs of different length. The long prong 37 carries a pin 38 on which the link 39 is mounted. The short arm 40 carries a pin 41 on which the links 42 are mounted. A cross bar 43 carries a pivot 44 connected to the link 41 and a pair of pivots 45 connect it to the links 39. Midway between the pins 44 and 45 are pivots 46 that are mounted on the upper ends of a bracket 47 secured by the screw 48 and clamp 49 to the rack bar 50. The position of this bracket 47 may be determined by the screw 51. The rack bar 50 meshes with a gear 52 connected to the shaft 53 (Fig. 3), which has a conical point bearing 54 in the bracket 55 carried by the dial 5, and a second bearing 56 in the dial itself. An indicating hand 6 of any character is mounted on the forward reduced extension 57 of this shaft and is swung across the face of the dial with the movements of the rod 1 although the ratio of movement may vary.

The rack bar 50 may be supported in any desired manner. Referring to Figs. 1 and 2, brackets 60 on the back of the case support pivots 61 that engage the swinging frame 62. A connecting frame consists of a web 63 and cross bars 64 engaged by the pivots 65 carried by the main frame 62 and by pivots 66 carried by the bracket 67 that extends down from the rack bar. The rack bar will thereby be permitted to move longitudinally in engagement with the gear 52.

If desired, the rack bar may be provided with cylindrical extensions 69 (Fig. 4) that are supported by the grooved wheels 70, carried by pivots 72 mounted on brackets 73 secured to the dial. Instead of the mechanism shown in Fig. 1 for connecting the arm 35 to the rack bar, a sleeve 75 (Figs. 5 and 6) may be mounted on pivots 76 carried by the bracket 77 on the rack bar. The lower end of the arm would be made of even dimensions so that it could slide freely in this sleeve without lost motion.

In both constructions, the central line of the crank arm 35 will always pass through the pivots 44 or 76, and the increment of movement of the rack bar will always be proportional to the increment in the tangent of the angle through which the pendulum swings as will appear from the demonstration of Fig. 8.

Fig. 8 is a diagram that may be employed to demonstrate the relation between the load on the rod 1 and the tangent of the angle through which the crank arm 35 (D in Fig. 8) swings, and that for equal increments of load, this tangent increases equal amounts in length. It will be understood that the entire mass of the pendulums and the parts connected thereto may be considered as concentrated at W at the end of the arm B pivoted at O, and that the pendulum W will be swung out from the vertical line E F to form an angle $a$. The load L acts on the arm A parallel to the arm $A^1$ which is at right angles to the crank arm D. The angles between the arms A and $A^1$ and the horizontal lines G H are designated $d$ and are equal to the angle $d$ between the arm D and the perpendicular. The arm D intersects the rack bar 49 at 46 so that the tangent of the angle $d$ may be considered as the line of movement of the rack bar.

With any load L on the rod 1, the relation of the parts will be $$LA \sin. c = WB \sin. a$$
$$b + c = 180° + a$$
$$\sin. a = -\sin. (180° + a) = -\sin. (b+c)$$
$$LA \sin. c = -WB \sin. (b+c =$$
$$-WB (\sin. c \cos. b + \cos. c \sin. b)$$

Therefore $$L = \frac{-WB \sin. c \cos. b - WB \cos. c \sin. b}{A \sin. c}$$

$$L = \frac{-WB \cos. b}{A} \quad \frac{-WB \sin. b}{A} \cot. c$$

As $b$ is more than 90° and less than 180°, $$\cos. b = -\sin. (b-90°) \text{ and } \sin. b = \cos. (b-90°)$$

$$L = \frac{WB}{A} \sin. (b-90°) - \frac{WB}{A} \cos. (b-90°) \cot. c.$$

When $c$ equals 90°

$$L = \frac{WB}{A} \sin. (b-90°)$$

since $\cot. 90° = 0$

When $c$ is less than 90° or 90° $-d$ $$L = \frac{WB}{A} \sin. (b-90°) - \frac{WB}{A} \cos. (b-90°) \tan. d$$

since $\cot. (90°-d) = \tan. d.$

When $c$ is greater than 90° or $90° + d$ $$L = \frac{WB}{A} \sin.(b-90°) + \frac{WB}{A} \cos.(b-90°) \tan. d,$$

since $\cot.(90°+d) = -\tan. d$

But the angle $b$ is constant and therefore $\sin.(b-90°)$ and $\cos.(b-90°)$ are constant.

W, B and A are always constant and $\frac{WB}{A} \sin.(b-90°)$ may be written as M and $\frac{WB}{A} \cos.(b-90°)$ as N.

Hence $L = M - N \tan. d$ when $c$ is less than 90°
$L = M$ when $c$ is 90° and $L = M + N \tan. d$ when $c$ exceeds 90°.

Referring now to Fig. 8, it will be seen that when the arm D is vertical and the arms A and $A^1$ are horizontal, the load will equal a constant or M. As the load is increased or decreased, the arm D will swing to the right or left and the angle $d$ will have a tangent whose length varies directly with the load L. As the rack bar 49 may always be positioned to move parallel to the magnet of $d$, it will be evident that the pinion 52 will be turned in proportion to the increments in the load on the rod 1.

I claim:

1. In a scale, the combination of a case, a load supporting rod extending up into said case, a pendulum pivotally mounted in the case and having an arm connected to said rod, a bell crank, a link connecting one arm thereof to said pendulum so that the bell crank will swing through the same arcs as said pendulum, a revoluble shaft, an indicator and a gear secured to said shaft, a rack-bar meshing with said gear, and connecting means between the bell crank and rack-bar to convert the swinging movement of the bell crank into a rectilinear movement of the rack-bar.

2. In a scale, the combination of a case, a load supporting rod extending up into said case, a pendulum pivotally mounted in the case and having an arm connected to said rod, a bell crank pivotally mounted in the case, a link connecting one arm thereof to said pendulum so that the bell crank will swing through the same arcs as the pendulum, a dial, an indicator adapted to swing across the dial, a shaft to support the indicator, a gear connected thereto, a rack-bar meshing with said gear, means to support the rack-bar and cause it to move longitudinally, and connecting means between the bell crank and rack-bar to cause the rack-bar to move equal increments of distance for equal increments of load of the rod supporting the load.

3. In a scale, the combination of a pair of supports, a pendulum mounted on each support and having an arm extending toward the other pendulum, a load supporting rod, means connecting the rod to said pendulums, a crank arm connected to one of said pendulums, a bell crank pivoted adjacent said pendulum and having an upper arm of the same length as said crank arm, a link connecting said arms, a dial, a shaft extending therethrough, a pinion on said shaft, a horizontally movable rack-bar meshing with said pinion, a right-line connection between the lower arm of the bell crank and said rack-bar, and an indicator secured to said shaft.

4. In a scale, the combination with a case, a pendulum, a support therefor and a load supporting rod connected to said pendulum, a crank arm pivotally mounted in said case, means to cause the crank arm to swing through equal arcs with said pendulum, a shaft and an indicator thereon, a gear mounted on the shaft, a longitudinally movable rack-bar meshing with said gear, and a connection between the crank arm and rack-bar including a pivot connected to said rack-bar, said connection being so constructed that said pivot will remain in the same alinement with the crank arm during all movements of the weighing mechanism.

5. In a scale, the combination with a case, a pendulum mounted therein, a load supporting rod connected to the pendulum, a crank arm pivotally mounted in said case and having a bifurcated end, means to cause the arm to swing through equal arcs with said pendulum, a shaft and an indicator carried thereby, a gear secured to said shaft, a longitudinally movable rack-bar meshing with said gear, a block pivotally mounted intermediate its ends on said rack-bar, and links connecting to said block at equal distances from its pivot, said links connecting to the prongs of the bifurcated end of said crank arm.

6. In a scale, the combination of a frame, a pendulum mounted thereon, an arm on said pendulum, a pivot on said arm, a load supporting member connected to said pivot, a weight indicator actuator, a linkage connecting the pendulum and the indicator actuator so constructed that a point thereof shall move in a substantially straight line a distance from a fixed point substantially equal to a constant times the tangent of the arc that a radius in the pendulum makes with a fixed radius.

7. The combination of a lever and a fulcrum therefor, a rod and means to prevent the rod from moving laterally but permitting it to move longitudinally, a pair of pivots mounted on the end of said lever adjacent said rod and spaced apart laterally and longitudinally of the lever, a pivot on said rod, a connecting member mounted intermediate its ends on the pivot on said rod, and links connecting to the pivots on the lever and to pivots on the connecting member spaced equal distances from the pivot on the rod.

8. The combination of a movable member and a fulcrum therefor, a frame pivoted to swing about a stationary axis, a second frame pivotally mounted on the first to swing about an axis parallel to the axis of the first frame, a third frame pivotally mounted on the second to swing about an axis at right angles to the fulcrum of said movable member, and means pivotally connecting said third frame and said movable member whereby the third frame is forced to move in a straight line in the plane of said movable member.

9. In a scale, the combination of a frame, a pendulum mounted thereon, a load supporting arm and a linkage connected to the pendulum which moves upon the deflection of the load supporting member, said linkage having an element, a point of which is constrained to move in a substantially straight line a distance from a fixed point substantially equal to a constant times the tangent of the arc that a radius in the pendulum makes with a fixed radius, and indicating means actuated by said linkage.

10. In a scale, the combination of a pendulum, arms connected to said pendulum to swing through equal arcs therewith, one of said arms being connected to the load supporting mechanism and the other arm to the weight-indicating mechanism, both of said arms swinging through equal arcs with the pendulum, a weight-indicator actuating rod, and pivoted connecting means between the weight-indicator actuating arm and rod whereby the rod is caused to move longitudinally for equal increments of load a distance substantially equal to the tangent of the angle through which the said indicator arm swings multiplied by a constant.

11. In a scale, the combination of a pivotally mounted pendulum, a load supporting device connected to the pendulum, an arm connected to said pendulum to swing through equal arcs therewith and having a bifurcated end, a longitudinally movable indicator-actuating rod, a block pivotally mounted intermediate its ends on said rod, and links connecting to said block at equal distances from its pivot and to the prongs of the bifurcated end of said arm.

In testimony whereof I sign this specification.

FREMONT H. BUCKINGHAM.